(12) United States Patent
Miller et al.

(10) Patent No.: US 8,203,496 B2
(45) Date of Patent: Jun. 19, 2012

(54) TOP MOUNT MAST ANTENNA REINFORCEMENT

(75) Inventors: Nathan Miller, Canton, MI (US); Brian Kubacki, Royal Oak, MI (US); Nikia M Williams, Detroit, MI (US); Mark Courtright, Allen Park, MI (US); Rob J Scollard, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 12/952,040

(22) Filed: Nov. 22, 2010

(65) Prior Publication Data

US 2011/0068248 A1 Mar. 24, 2011

Related U.S. Application Data

(63) Continuation-in-part of application No. 12/058,676, filed on Mar. 29, 2008, now Pat. No. 7,839,345.

(51) Int. Cl.
*H01Q 1/32* (2006.01)
(52) U.S. Cl. ......... 343/715; 343/713; 403/197; 403/252
(58) Field of Classification Search .................. 343/711, 343/713, 715, 878; 403/197, 252, 259
See application file for complete search history.

(56) References Cited

U.S. PATENT DOCUMENTS

| 2,896,010 | A | * | 7/1959 | Newman | 174/153 A |
|---|---|---|---|---|---|
| 3,138,660 | A | * | 6/1964 | Cejka | 174/153 A |
| 4,136,986 | A | * | 1/1979 | Grashow et al. | 403/197 |
| 4,431,332 | A | | 2/1984 | Dieges | 403/252 |
| 6,236,377 | B1 | | 5/2001 | Hussaini | 343/882 |
| 6,714,171 | B2 | | 3/2004 | Haussler | 343/888 |
| 7,004,666 | B2 | | 2/2006 | Kozlovski | 403/252 |
| 7,088,297 | B2 | | 8/2006 | Nakano | 343/713 |
| 7,212,168 | B2 | * | 5/2007 | Kozlovski | 343/713 |
| 7,528,784 | B2 | * | 5/2009 | Yamada et al. | 343/713 |
| 2006/0103579 | A1 | | 5/2006 | Blickle | 343/711 |

* cited by examiner

*Primary Examiner* — Tho G Phan
(74) *Attorney, Agent, or Firm* — Greg Brown, Esq.; Miller Law Group, PLLC

(57) ABSTRACT

A mounting apparatus for a top mount mast antenna includes a secondary mounting bracket positioned below the fender panel to stabilize the antenna attachment screws extending through the antenna base into the fender panel of the automotive vehicle on which the antenna is mounted. The secondary mounting bracket is formed with a generally circular reinforcement collar that projects upwardly through the opening in the fender panel. The reinforcement collar has opposing retention tabs that pass through recesses formed in the opening. A rotation of the secondary mounting bracket within the opening rotates the retention tabs to a position overlying the fender panel, and moves deformable bosses into alignment with the screw holes in the fender panel. The rotation of the secondary mounting bracket is halted by the engagement of a closed side of the bosses with a flange of material created by the piercing of the screw holes.

20 Claims, 5 Drawing Sheets

TOP MOUNT MAST ANTENNA REINFORCEMENT

CROSS-REFERENCE TO RELATED APPLICATIONS

This application is a continuation-in-part of U.S. patent application Ser. No. 12/058,676, filed on Mar. 29, 2008, now issued as U.S. Pat. No. 7,839,345, on Nov. 23, 2010.

FIELD OF THE INVENTION

This invention relates generally to the mounting of a radio antenna to an automotive vehicle and, more particularly, to a reinforcement member that will keep the antenna mount from loosening from the fender.

BACKGROUND OF THE INVENTION

Automotive vehicles are typically provided with a radio that requires an antenna to receive the radio signal. Although some radio antennas have been built into the windshield or other components of the vehicle, the most effective and inexpensive radio antenna is a mast antenna that is conventionally mounted on the fender of the vehicle and operatively connected to the radio to provide a radio signal thereto. As is often found on full size trucks, the mast antenna is mounted directly to the fender and is not retractable into the fender to protect the antenna from damage. Thus, after the antenna has been subjected to a number of car wash cycles and routine driving, the screws that attach the mast antenna to the fender can loosen. Eventually, the loosened mounting screws will lead to the antenna being separated from the fender, particularly when subjected to an aggressive car wash cycle. Usually, a forceful separation of the mast antenna from the fender on which the antenna is mounted results in a deformation of the fender.

An automobile antenna mounting structure for positioning a mast antenna within an opening formed into the fender of the vehicle is disclosed in U.S. Pat. No. 4,431,332, granted to Paul Dieges on Feb. 14, 1984. This antenna mounting structure included a base that partially passes through the opening and a retainer located below the fender surface. Pointed wings twist and a connecting ring bends causing the connecting ring between plates of the retainer to bend and permit the toothed upper edges of the retainer plates to engage a toothed surface of the base. In U.S. Pat. No. 6,714,171, issued to Bradley Haussler, et al on Mar. 30, 2004, the antenna mounting device asserts a compressive force between the antenna and the fender panel through use of a forcing cone and anchor, and a member that compresses the anchor and forcing cone into one another.

Quick attach antenna mounting devices are disclosed in U.S. Pat. No. 7,004,666, issued on Feb. 28, 2006, to David Kozlovski, and in U.S. Pat. No. 7,088,297, issued on Aug. 8, 2006, to Kazuya Nakano, et al. In both of these patents, the antenna mounting device asserts a clamping force onto the panel, such as the fender structure, to which the antenna is to be mounted. The clamping forces in the Kozlovski patent are asserted with a washer having a plurality of upwardly extending fingers that engage the underside of the fender panel and fixed into a clamping load by a nut threaded onto a portion of the antenna. The clamping forces in the Nakano patent are asserted onto the fender panel by a functionally equivalent legged washer that is located below the fender panel and clamped through engagement with a bolt that threads into the antenna base.

Another universal antennal mounting system is taught in U.S. Pat. No. 6,236,377, granted on May 22, 2001, to Saied Hussaini, et al, wherein rocker arms of a mounting member extend through the opening of the fender panel. The antenna is secured to the fender panel by pulling upwardly on the antenna mast so that the hands on the rocker arms contact the inner surface of the fender panel. A compressive load is placed on the antenna by a threaded apparatus that draws the antenna upwardly to clamp the fender panel between the threaded apparatus above the fender panel and the rocker arms below the fender panel. U.S. Patent Application Publication No. 2006/0103579, by Gunther Blickle, published on May 18, 2006, discloses an apparatus for mounting an antenna on an automotive vehicle by a bayonet plate that is engaged with bolts the extend downwardly from the base plate of the antenna into slots formed in the bayonet plate. A compressive load is provided by spring washers engaged by a nut threaded onto a threaded part of the antenna.

None of the known prior art devices provide a mounting apparatus that will keep a screw mounted mast antenna from loosening and thus being subjected to a forceful separation from the fender panel. Furthermore, none of the known prior art devices utilize a mounting bracket that can be twist installed before connecting the mounting screws. Accordingly, it would be desirable to provide a reinforcement device that would be operable to reinforce the mounting of the mast antenna onto the fender panel while securing the mounting screws from loosening.

SUMMARY OF THE INVENTION

It is an object of this invention to overcome the aforementioned disadvantages of the known prior art by providing a reinforcement for a top mount mast antenna that will secure the mounting screws from loosening.

It is another object of this invention to provide a low cost, effective antenna mounting system for supporting a mast antenna on an automotive fender panel.

It is still another object of this invention to provide an antenna mounting system that includes a mounting bracket that can be twist installed for ease of installation.

It is an advantage of this invention that top mount mast antenna reinforcement provides installation flexibility.

It is a feature of this invention that the mast antenna mounting apparatus does not utilize a compressive design that clamps the antenna mounting device on the fender panel.

It is another feature of this invention that the reinforcement structure for the antenna mount is independent of the structural architecture of the vehicle.

It is still another feature of this invention that the reinforcement for the top mount mast antenna utilizes a nylon part to be engaged by the mounting screws.

It is another advantage of this invention that the nylon reinforcement part is highly resistant to changes due to temperature extremes.

It is still another feature of this invention that the nylon reinforcement part can be installed prior to assembly of the antenna, and even prior to the painting of the fender panel.

It is still another advantage of this invention that the reinforcement structure can be utilized on multiple vehicle lines, as the reinforcement structure is not dependent on vehicle architecture.

It is a further object of this invention to provide a top mount mast antenna reinforcement member that is durable in construction, inexpensive of manufacture, carefree of maintenance, facile in assemblage, and simple and effective in use.

These and other objects, features and advantages are accomplished according to the instant invention by providing a mounting apparatus for a top mount mast antenna that includes a secondary mounting bracket positioned below the fender panel to stabilize the antenna attachment screws extending through the antenna base into the fender panel of the automotive vehicle on which the antenna is mounted. The secondary mounting bracket is formed with a generally circular reinforcement collar that projects upwardly through the opening in the fender panel. The reinforcement collar has opposing retention tabs that pass through recesses formed in the opening. A rotation of the secondary mounting bracket within the opening rotates the retention tabs to a position overlying the fender panel, and moves deformable bosses into alignment with the screw holes in the fender panel. The rotation of the secondary mounting bracket is halted by the engagement of a closed side of the bosses with a flange of material created by the piercing of the screw holes.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
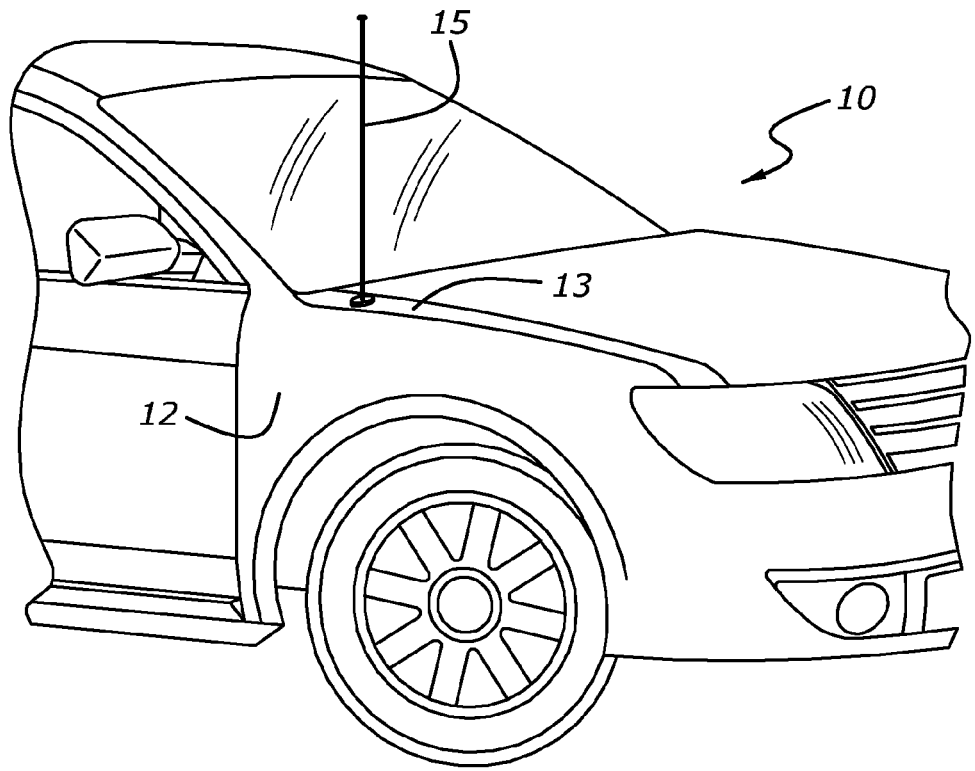
FIG. 1 is a partial perspective view of an automotive vehicle having a representative mast antenna mounted on the right front fender panel of the vehicle.

Referring to FIGS. 1-4, an automotive vehicle having a top mount mast antenna supported on a representative fender panel and incorporating the principles of the instant invention can best be seen. The automotive vehicle is shown in FIG. 1 with the representative antenna being mounted on the right front fender panel. One skilled in the art will recognize that the precise location of the mounting of the mast antenna is variable depending on the architecture of the vehicle and could be on either front fender panel, or even on either of the rear fender panels or other suitable support panel on the vehicle. Some automotive vehicles, particularly full sized trucks, have the antenna mounted directly to the vehicle's fender by screws passing through a mounting bracket into the fender. Such antenna mounting arrangements suffered from the screws loosening which presents the possibility of the antenna becoming separated from the fender on which the antenna was mounted. To prevent the mounting screws from loosening from the fender structure, a secondary part is provided to stabilize the antenna attachment screws.

The representative automobile 10 depicted in FIG. 1 is shown with the antenna 15 mounted on the right front fender 12 of the vehicle 10. The front fender 12 is manufactured with a mounting surface 13 thereon at which the antenna 15 is mounted. A top mast mounting apparatus 20 is provided to support the antenna 15 on and through the fender 12. The top mast mounting apparatus 20 includes a primary mounting collar 22 through which conventional mounting screws 24 are extended to engage the mounting surface 13 of the vehicle fender 12. A secondary mounting member 25 is added to the fender 12 to underlie the mounting surface 13 and engage the antenna 15, as will be described in greater detail below. The primary function of the secondary mounting member 25 is to be positioned for engagement with the mounting screws 24 to prevent the mounting screws 24 from loosening.

The secondary mounting member 25 is manufactured from a deformable material that will engage the threads of the mounting screws 24 to prevent the mounting screws from loosening. Preferably, the secondary mounting member 25 is formed from nylon. The secondary mounting member 25 includes a generally planar reinforcement disk 26 that is oriented below the mounting surface 13 of the vehicle fender 12 and has a sufficient size to permit engagement thereof with the mounting screws 24. The center of the reinforcement disk 26 is formed with a passageway 27 for the passage of the antenna 15. Integral with the reinforcement disk 26, the secondary mounting member 25 also includes a plurality of retention tabs 28 that project upwardly from the reinforcement disk 26 to pass through the opening 14 and engage the mounting surface 13 of the fender 12 and secure the secondary mounting part 25 in position on the fender 12.

Figure 3:
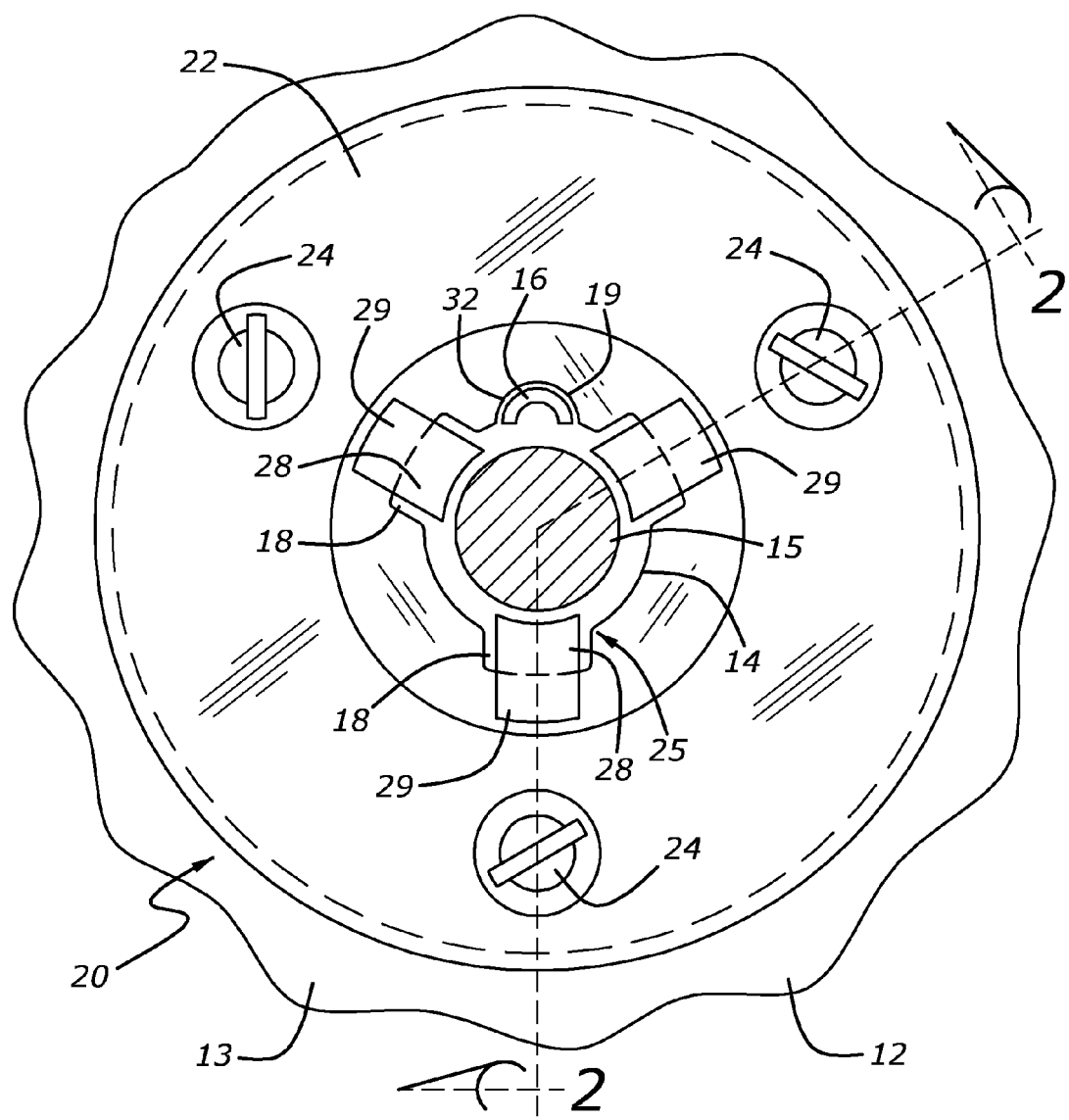
FIG. 3 is a top plan view of the mounting apparatus connecting the top mount mast antenna to the fender panel of the automotive vehicle, the antenna being shown in cross-section and the fender panel being broken away for purposes of clarity.
Figure 4:
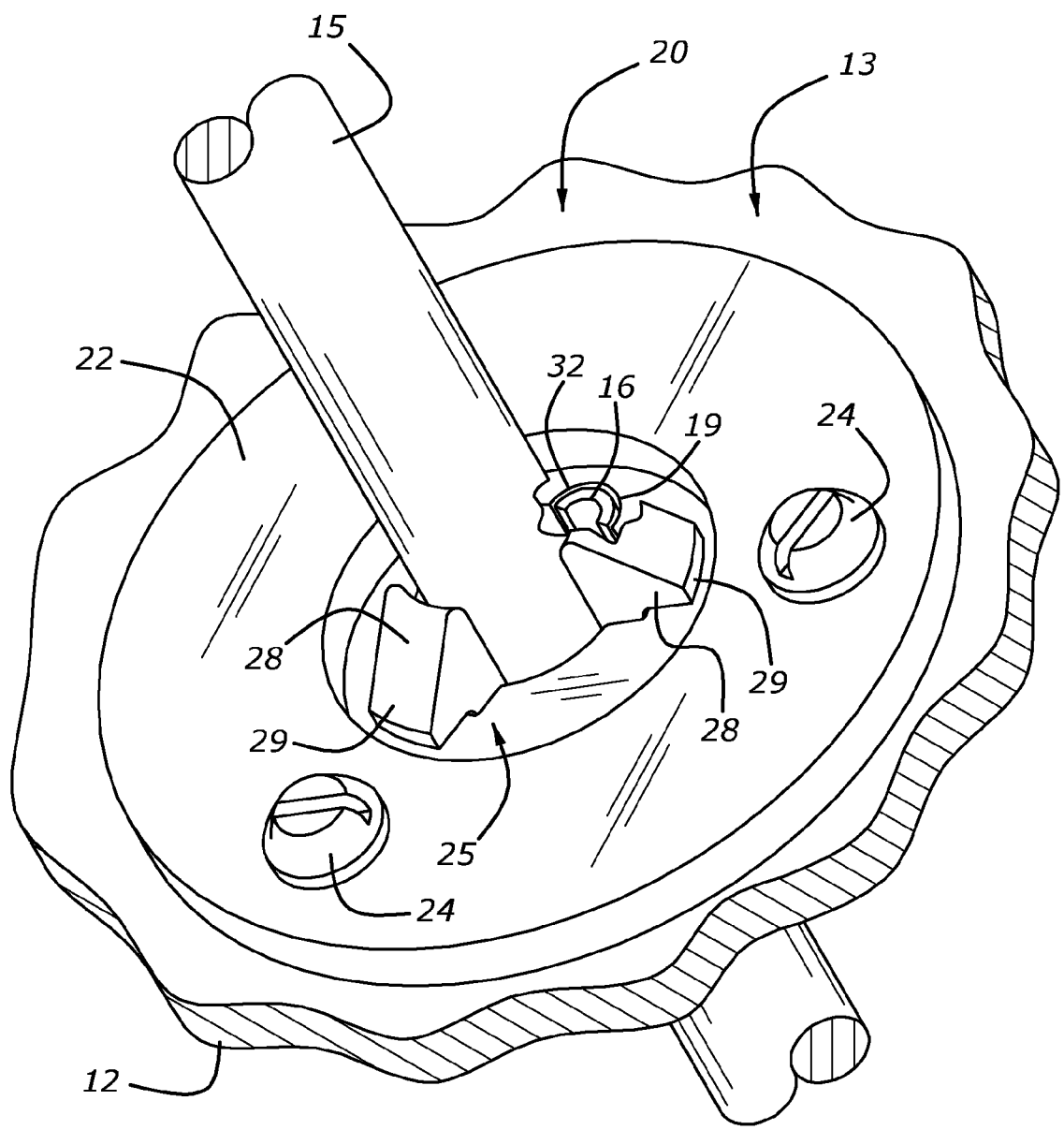
FIG. 4 is a perspective view of the mounting apparatus shown in FIG. 3.

Preferably, the opening 14 in the fender 12 is formed with a plurality of recesses 18 that are oriented respectively to receive the passage of the retention tabs 28 and to locate the retention tabs 28 between the fender structure 12 and the antenna 15. The retention tabs 28 are formed with retention clips 29 that overlap the mounting surface 13 of the fender 12 to secure the secondary mounting member 25 in place on the fender 12. The retention tabs 28 are spaced circumferentially around the passageway 27, as is best seen in FIGS. 3 and 4, and sized so that the individual retention tabs 28 will deflect inwardly when the secondary mounting member 25 is installed on the fender 12. The antenna 15 includes a semicircular projection 16 that is receivable within a detent 19 formed in the fender 12 and a corresponding depression 32 in the reinforcement disk 26 located between two of the retention tabs 28 so that when properly positioned within the opening 14 the antenna projection 16 engages the detent 19 and the depression 32 to prevents the antenna 15 from rotating within the opening 14.

Figure 2:
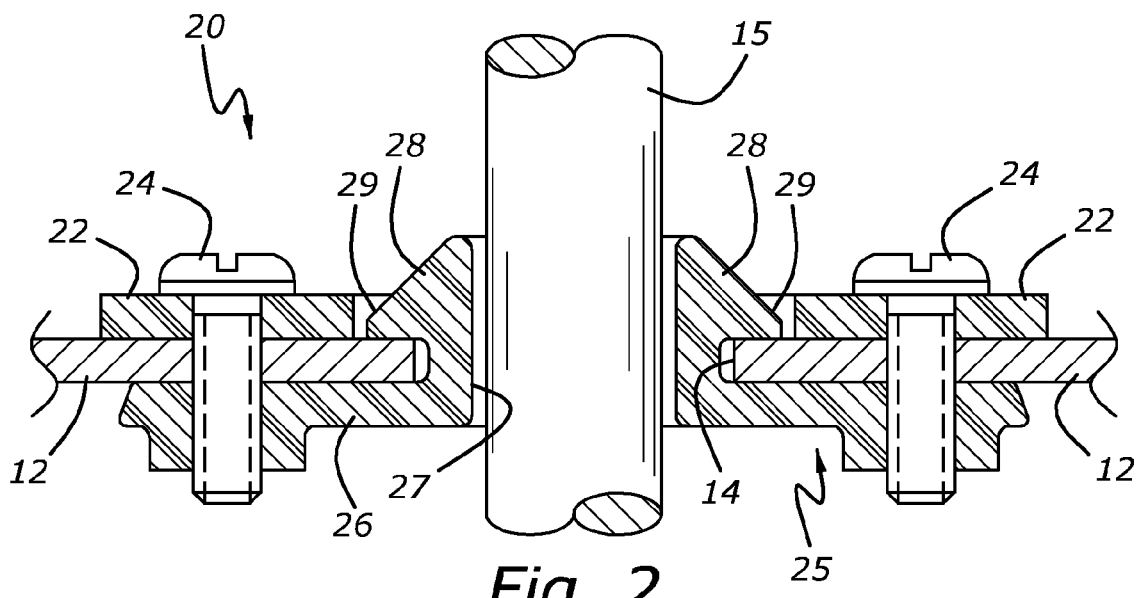
FIG. 2 is a cross-sectional view taken along lines 2-2 of FIG. 3 through the reinforcement member and base member of the antenna incorporating the principles of the instant invention.

As can be seen in FIGS. 2-4, the antenna 15 is located though the opening 14 in the fender and through the passageway 27 within the reinforcement disk 26 to extend above the fender and receive radio signals. The antenna 15 is mounted to the fender 12 by the primary collar 22. The mounting screws 24 pass through the primary mounting collar 22 and through the fender 12 to engage the reinforcement disk 26 of the secondary mounting member 25. The deformable nylon reinforcement disk 26 engages the threads of the mounting screws 24 so that the screws 24 won't loosen without a predetermined minimum torque being imposed on the mounting screws 24 to cause turning thereof.

The retention tabs 28 with the overlying retention clips 29 deflect when installed and then snap into place on the fender 12 with the retention tabs 28 positioned within the recesses 18 so that the secondary mounting member 25 does not require engagement with the mounting screws 24 to be retained in position on the fender 12. Accordingly, the secondary mounting member 25 can be installed on the fender 12 at anytime in the assembly process prior to paint being applied to the fender 12. Preferably, the secondary mounting member 25 is installed on the fender at the location of manufacture of the fender 12 before being shipped to the assembly plant for installation on the vehicle 10.

The use of nylon, or other suitable polymer, provides a secondary mounting member 25 that is highly resistant to extreme temperatures, which enables the secondary mounting member 25 to be installed prior to painting the fender 12 and passage through e-coat baking ovens, as well as be able to withstand extreme environmental conditions. Furthermore, the simplicity of the design of the secondary mounting member 25 enables the secondary mounting member 25 to be utilized irrespective of the architecture of the vehicle 10 to provide a low cost alternative to the conventional crush-mount antenna mounting devices.

Referring now to FIGS. 5-8, an alternative configuration of the secondary mounting bracket 40 can best be seen. The secondary mounting bracket 40 is formed with a reinforcement collar 41 that defines a central opening 42 through the secondary mounting bracket 40 for the passage of the antenna 15. The reinforcement collar 41 is formed with a semi-circular depression 43 that will receive the projection 16 on the antenna mast base and prevent the antenna 15 from rotating once installed. The secondary mounting bracket 40 is also preferably formed with three mounting bosses 45 that are alignable with holes 36 formed in the fender 12 for the passage of fasteners 24 to secure the secondary mounting bracket 40 to the fender 12. The reinforcement collar 41 is also formed with opposing retention tabs 44 formed with retention clips, similar to that described above with respect to the secondary mounting member 25, to help secure the secondary mounting collar 40 to the fender 12, as will be described in greater detail below.

The fender 12 is formed with a central opening 14 shaped to correspond to the formed shape of the secondary mounting bracket 40, and with the holes 36 therethrough for the passage of the fasteners 24 to connect to the secondary mounting bracket 40. Preferably, the holes 36 will be nail pierced which deflects a flange of material (not shown) below the underside of the fender 12. These tabs of material will be operable to restrict rotational movement of the secondary mounting bracket 40, as will be described below. The central opening 14 is generally circular in shape to correspond to the shape of the reinforcement collar 41, but is also formed with a pair of opposing recesses 18 to receive the retention tabs 44 and with a detent 19 alignable with the depression 43 on the reinforcement collar 41.

Figure 5:
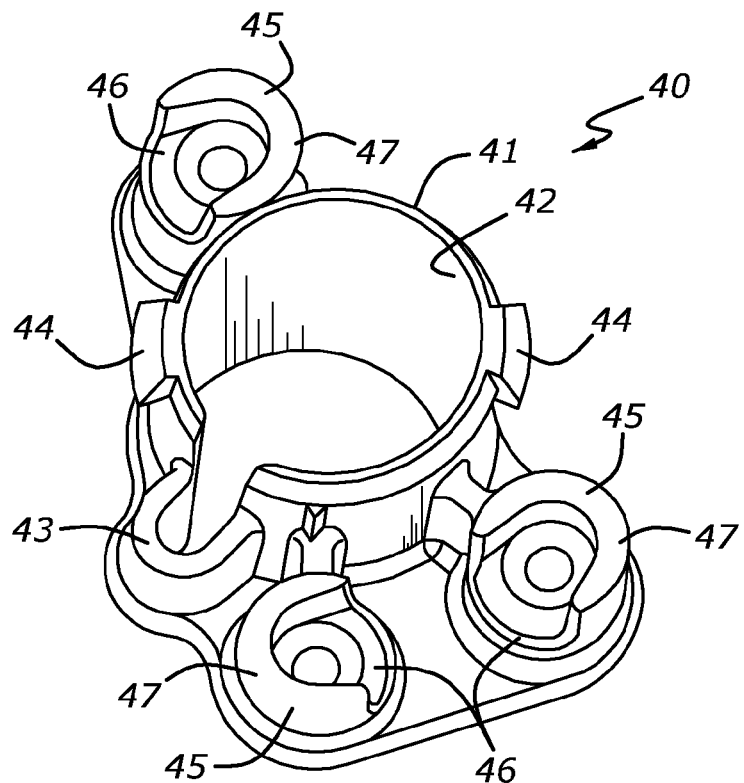
FIG. 5 is perspective view of an alternative configuration of the secondary mounting bracket.

As is best seen in FIG. 5, the bosses 45 are formed with material missing on one side thereof to create an open side 46 that will allow the passage of the flange of material (not shown) formed with the nail piercing of the holes 36 when the secondary mounting bracket 40 is twisted into place. The opposing closed side 47 of the boss 45 extends vertically higher than the open side 46 and engages the flange of material (not shown) to stop the rotation of the secondary mounting bracket 40 during the installation thereof. Furthermore, the depression 43 is also constructed with material missing so that the top surface of the depression 43 is lower than the top surface of the reinforcement collar 41 to allow clearance for the twist-in installation of the secondary mounting bracket 40.

Figure 6:
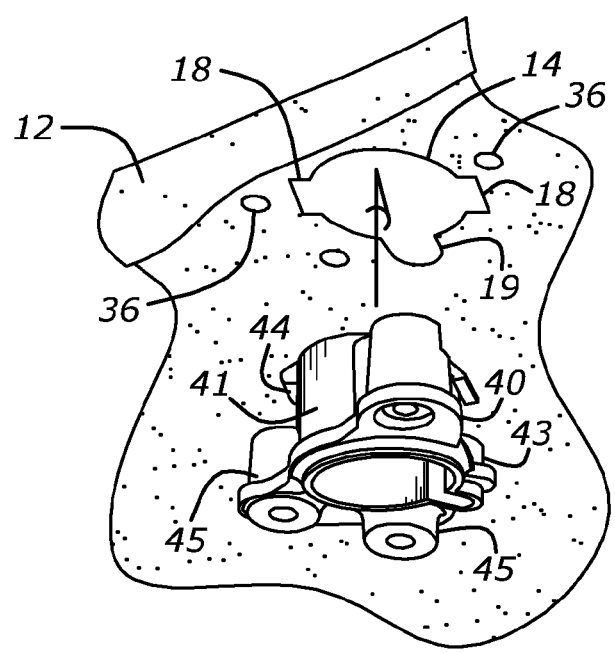
FIG. 6 is a partial perspective view of the underside of the fender on which the top mount mast antenna is to be mounted, the alternative secondary mounting bracket being depicted as being moved into position for mounting on the fender.
Figure 7:
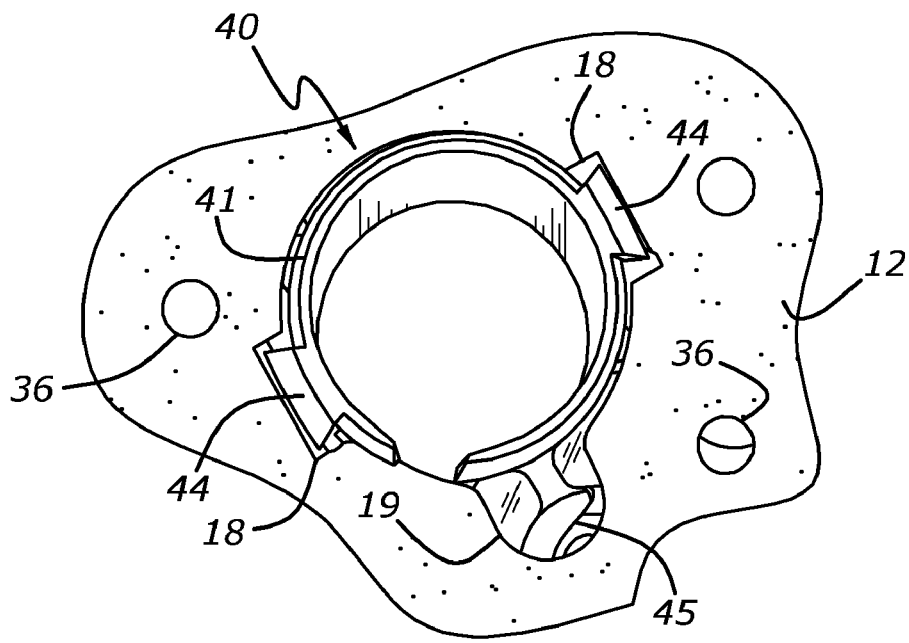
FIG. 7 is a partial perspective view of the top side of the fender shown in FIG. 6 with the alternative secondary mounting bracket being engaged into an initial position through the opening formed in the fender.
Figure 8:
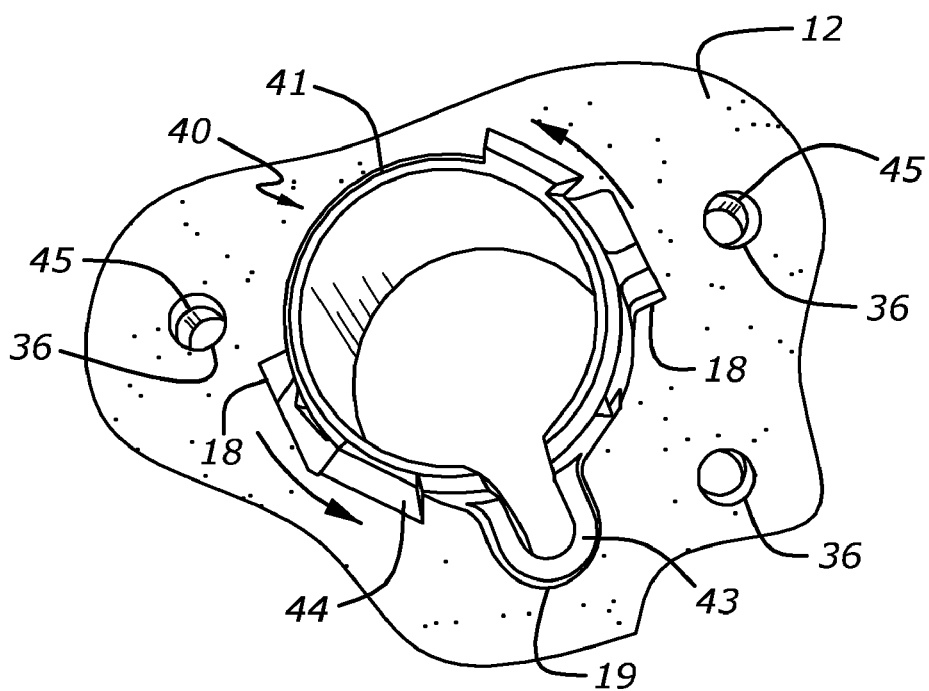
FIG. 8 is a partial perspective view of the top side of the fender similar to that depicted in FIG. 7 with the alternative secondary mounting bracket being twisted within the opening to position the alternative secondary mounting bracket in a mounting position to be secured to the fender.

Installation of the secondary mounting bracket 40 is depicted in FIGS. 6-8. The fender 12, formed with the central opening 14, recesses 18, nail pierced fastener holes 36 and the detent 19, is approached from underneath with the secondary mounting bracket 40, as is shown in FIG. 6. The secondary mounting bracket 40 is oriented with the retention tabs 44 aligned with the recesses 18 and the secondary mounting bracket 40 is pushed upwardly through the central opening 14 with the retention tabs 44 passing through the recesses 18 and the reinforcement collar 41 extending slightly upwardly through the central opening 14. In this initial positioning of the secondary mounting bracket 40, which is shown in FIG. 7, the bosses 45 are not yet aligned with the nail pierced holes 36 for connection with the fasteners 24.

As is shown in FIG. 8, the secondary mounting bracket 40 is then twisted counterclockwise (when viewed from above the fender 12) so that the retention tabs 44 pass over the structure of the fender 12 to the side of the recesses 18, which retains the secondary mounting bracket 40 in place on the fender 12. This twisting of the secondary mounting bracket 40 moves the depression 43 into alignment with the detent 19 and moves the bosses 45 into alignment with the holes 36 with the flange of material passing through the open sides 46 of the bosses 45 until engaging the closed sides 47 of the bosses and, thus, stopping the rotation of the secondary mounting bracket 40 at a location where the bosses 45 are aligned with the holes 36 to allow passage of the fasteners 24 into the bosses 45. A primary mounting collar 22 can also be utilized with the alternative secondary mounting bracket 40 to enhance the effectiveness of the fasteners 24 which deform the bosses 45 in the nylon (or other suitable polymer) secondary mounting bracket 40 as is described above.

It will be understood that changes in the details, materials, steps, processes and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle having a structural surface for the mounting of an antenna to extend upwardly from the structural surface, the structural surface having an opening formed therein for the passage of the antenna, the antenna being associated with a primary mounting collar for the mounting of the antenna to the structural surface, said primary mounting collar being detachably connected to the structural surface by fasteners, the improvement comprising:

a secondary mounting bracket constructed of a deformable material and including a plurality of bosses positioned below the structural surface for engagement with the fasteners by threading directly into said bosses to secure the fasteners from loosening without requiring a predetermined torque to be applied to the fasteners.

2. The automotive vehicle of claim 1 wherein said secondary mounting bracket is constructed of nylon.

3. The automotive vehicle of claim 1 wherein said secondary mounting bracket further includes at least a pair of opposing retention tabs projecting outwardly from a reinforcement collar passing through said opening in said structural surface to pass through recesses formed in said opening to support said secondary mounting bracket on said structural surface with said bosses being located below said structural surface.

4. The automotive vehicle of claim 3 wherein each said retention tab overlies the structural surface adjacent the recesses to support said secondary mounting bracket on said structural surface after said secondary mounting bracket has been twisted within said opening in said structural surface.

5. The automotive vehicle of claim 4 wherein said structural surface is also formed with pierced fastener holes created with a downwardly depending flange of material, each said boss having an open side to allow passage of said flange of material upon rotation of said secondary mounting bracket until said flange of material engages an opposing closed side of said boss.

6. The automotive vehicle of claim 5 wherein said secondary mounting bracket also includes a depression alignable with a detent formed at said opening in said structural surface to receive a projection on said antenna to prevent rotation of said antenna relative to said structural surface once said secondary mounting bracket has been twisted into a desired orientation on said structural surface.

7. The automotive vehicle of claim 6 wherein said depression located below said structural surface and in alignment with said detent when said secondary mounting bracket has been twisted into said desired orientation.

8. A secondary support bracket cooperable with a primary mounting member for mounting an antenna on a structural surface of an automotive vehicle having an opening formed therein for the passage of the antenna, said primary mounting member including fasteners extending through holes in said structural surface from said primary mounting member, comprising:
   a reinforcement collar defining a central passageway for the passage of said antenna therethrough, said reinforcement collar extending through said opening from below the structural surface;
   a plurality of retention tabs projecting outwardly from said reinforcement collar to pass through said opening in the structural surface to support said primary mounting member on said structural surface, and
   a plurality of bosses integrally formed with said reinforcement collar and being positioned below said structural surface for engagement with the fasteners to secure the fasteners from loosening without requiring a predetermined torque to be applied to the fasteners.

9. The secondary support bracket of claim 8 wherein said opening is formed with a plurality of recesses to receive said retention tabs, said retention tabs and said recesses being spaced circumferentially around said passageway.

10. The secondary support bracket of claim 9 wherein the rotation of said reinforcement collar within said opening moves said retention tabs to a position overlying said structural surface to retain said secondary support bracket on said structural surface.

11. The secondary support bracket of claim 10 wherein said secondary support bracket is constructed of a polymer.

12. The secondary support bracket of claim 11 wherein said reinforcement collar also includes a depression between two of said retention tabs and being alignable with a detent formed at said opening in said structural surface to receive a projection on said antenna to prevent rotation of said antenna relative to said structural surface once said antenna is installed.

13. The secondary support bracket of claim 12 wherein said bosses are formed with an open side and an opposing closed side, said holes being formed by piercing to create a flange of material projecting below said structural surface, the engagement of said closed side of said bosses with said flange of material stopping the rotation of said secondary support bracket at a desired orientation.

14. The secondary support bracket of claim 13 wherein the rotation of said secondary support bracket orients said bosses in alignment with said holes and orients said depression into alignment with said detent.

15. An apparatus for mounting a top mast antenna on a structural surface of an automotive vehicle having an opening formed therein for the passage of the antenna through the structural surface, comprising:
   a primary mounting member positionable on said structural surface and having mounting screws passing through said primary mounting member and through pierced holes formed in said structural surface and having a flange extending below said structural surface; and
   a secondary mounting bracket formed of deformable material and supported from said structural surface for engagement by said mounting screws, said secondary mounting bracket including a plurality of bosses positioned below said structural surface to receive said mounting screws by threading said mounting screws directly into said bosses, said secondary mounting bracket being positionable into a final desired position by rotating said secondary mounting bracket within said opening, at least one of said bosses having an open side to allow the passage of the corresponding said flange and a closed side to engage said flange to stop the rotation of said secondary mounting bracket when said final desired position is reached.

16. The apparatus of claim 15 wherein said secondary mounting bracket comprises:
   a reinforcement collar projecting upwardly through said opening and being integrally formed with said bosses, said reinforcement collar having a passageway formed therein to permit passage of the antenna; and
   support structure integrally formed with said reinforcement collar to project outwardly therefrom on opposing sides of said passageway to pass through said opening and engage said structural surface to retain said secondary mounting bracket on said structural surface.

17. The apparatus of claim 16 wherein said support structure includes a pair of retention tabs positioned on opposing sides of said passageway and projecting outwardly from said reinforcement collar to pass through said opening in the structural surface and support said secondary mounting bracket on said structural surface.

18. The apparatus of claim 17 wherein said opening is formed with recesses corresponding to said retention tabs, each said retention tab passing through a corresponding said recess as said reinforcement collar is extended through said opening, said retention tabs overlying the structural surface adjacent the opening when said secondary mounting bracket is rotated within said opening.

19. The apparatus of claim 18 wherein said retention tabs are engaged with said structural surface circumferentially adjacent the corresponding said recessed when said secondary mounting bracket is located in said final desired position, said mounting screws causing deformation of said bosses to prevent said mounting screws from loosening unless a predetermined torque is applied to turn said mounting screws.

20. The apparatus of claim 19 wherein said reinforcement collar also includes a depression between said retention tabs and being alignable with a detent formed at said opening in said structural surface to receive a projection on said antenna that prevents rotation of said antenna relative to said structural surface once said antenna is installed into said secondary mounting bracket.

* * * * *